United States Patent
van As et al.

(10) Patent No.: US 9,350,692 B1
(45) Date of Patent: May 24, 2016

(54) INTEGRATION OF EMAIL AND PERSISTENT CONVERSATIONS

(71) Applicant: Google Inc., Mountain View, CA (US)

(72) Inventors: Thijs van As, Zurich (CH); Benjamin David Eidelson, Palo Alto, CA (US); Kevin Smilak, Torrance, CA (US); Christian Nester, Zurich (CH); Ian Flanigan, Zurich (CH); Balázs Szabó, Zurich (CH)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/894,346

(22) Filed: May 14, 2013

(51) Int. Cl.
*G06F 15/16* (2006.01)
*H04L 12/58* (2006.01)

(52) U.S. Cl.
CPC ...................................... *H04L 51/16* (2013.01)

(58) Field of Classification Search
None
See application file for complete search history.

(56) References Cited

U.S. PATENT DOCUMENTS

| | | | |
|---|---|---|---|
| 7,328,242 B1* | 2/2008 | McCarthy et al. | 709/204 |
| 2006/0031331 A1* | 2/2006 | LoBuono et al. | 709/206 |
| 2006/0155785 A1* | 7/2006 | Berry et al. | 707/204 |
| 2007/0174408 A1* | 7/2007 | Paul et al. | 709/207 |
| 2008/0071865 A1* | 3/2008 | Dutta | 709/206 |
| 2009/0119606 A1* | 5/2009 | Gilbert | 715/758 |
| 2013/0031185 A1* | 1/2013 | Wyatt | 709/206 |
| 2014/0204173 A1* | 7/2014 | Eidelson et al. | 348/14.08 |

\* cited by examiner

*Primary Examiner* — Esther B Henderson (57) ABSTRACT

Systems, methods and computer readable media for persistent conversation and email integration are described. Some implementations can include a method comprising receiving a persistent conversation communication message sent from a first user to at least one other user, and adding the message to an email thread associated with the persistent conversation. The method can also include storing the persistent conversation message as part of the email thread, and creating a new email thread associated with the persistent conversation when a predetermined condition is met, wherein the condition is one of an elapsed time or reaching a predetermined number of messages in the email thread. The method can further include rendering a displayable version of the persistent conversation within an email client, the displayable version including a continuous display of email threads associated with the persistent conversation.

15 Claims, 10 Drawing Sheets

INTEGRATION OF EMAIL AND PERSISTENT CONVERSATIONS

BACKGROUND

Computer and mobile device users may be increasingly communicating with each other using numerous different devices ranging from a desktop computer to a smartphone and/or tablet device, and users may often interact with more than one device type during a given day. Users may also be communicating using a variety of channels and protocols such as text messaging, instant messaging, email, social network messages, chat, one-to-one and/or multi-way audio and/or video conferences (audio/video conference), and the like. Messages in these various communication protocols and channels may be exchanged via persistent conversations.

Some email systems may not store or present a continuous communication stream, such as a persistent conversation between one user and one or more other users.

SUMMARY

Some implementations relate generally to electronic communication, and, more particularly, to integrating persistent conversations and email.

Some implementations can include a method comprising receiving a persistent conversation communication message sent from a first user to at least one other user, and adding the message to an email thread associated with the persistent conversation. The method can also include storing the persistent conversation message as part of the email thread, and creating a new email thread associated with the persistent conversation when a predetermined condition is met, wherein the condition is one of an elapsed time or reaching a predetermined number of messages in the email thread. The method can further include rendering a displayable version of the persistent conversation within an email client, the displayable version including a continuous display of email threads associated with the persistent conversation.

Some implementations can include receiving a persistent conversation communication message sent from a first user to at least one other user, and adding the message to an email thread associated with the persistent conversation. The method can also include storing the persistent conversation message as part of the email thread, and creating a new email thread associated with the persistent conversation when a condition is met. The method can further include rendering a displayable version of the persistent conversation within an email client, the displayable version including a continuous display of email threads associated with the persistent conversation.

In some implementations, the communication message can include a chat message. The condition can include an elapsed time between messages in the persistent conversation exceeding a threshold. The condition can include reaching a predetermined number of messages in the email thread.

The method can also include updating the email thread to reflect new activity in the persistent conversation. The method can further include providing for display a user interface including the displayable version of the persistent conversation.

Creating a new email thread associated with the persistent conversation can include assigning the new email thread an identifier associated with the persistent conversation. The method can also include dynamically updating the displayable version to show updates to the persistent conversation as the updates are received by an email client application.

Some implementations can include a system comprising one or more computers configured to perform operations. The operations can include receiving a persistent conversation communication message sent from a first user to at least one other user. The operations can also include adding the message to an email thread associated with the persistent conversation, and storing the persistent conversation message as part of the email thread. The operations can further include creating a new email thread associated with the persistent conversation when a condition is met, and rendering a displayable version of the persistent conversation within an email client, the displayable version including a continuous display of email threads associated with the persistent conversation.

The communication message can include a chat message. The condition can include an elapsed time between messages in the persistent conversation exceeding a threshold. The condition can include reaching a predetermined number of messages in the email thread.

The operations can also include comprising updating the email thread to reflect new activity in the persistent conversation. The operations can further include providing for display a user interface including the displayable version of the persistent conversation.

Creating a new email thread associated with the persistent conversation can include assigning the new email thread an identifier associated with the persistent conversation. The operations can further include dynamically rendering the displayable version to show updates to the persistent conversation as the updates are received by an email client application.

DETAILED DESCRIPTION

In some implementations, a method can include integrating a persistent conversation into an email system. Persistent conversations can differ from email messages in that each persistent conversation can be stored in a central conversation storage object that is shared with client applications associated with conversation participants. Typically, in email systems, a copy of each message is sent to and stored in an email client of each recipient.

Participants in the persistent conversation can view some or all of the persistent conversation messages stored in the persistent conversation object within an email client application. Some implementations can include providing a persistent conversation from a central conversation storage object, integrating the persistent conversation object with an email system and automatically updating the rendering of the persistent conversation in the email client so that the persistent conversation appears as a continuous email thread. When a persistent conversation reaches a number of messages that exceed an email thread maximum length, one or more additional threads can be started. Each new thread can include an identifier that so that an up-to-date view of the conversation can be displayed within an email client application.

Figure 8:
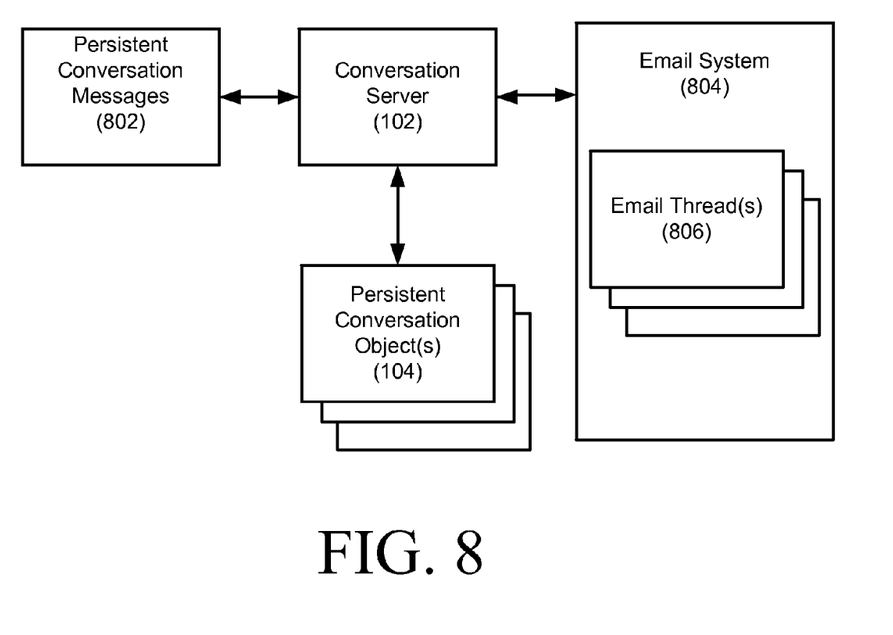
FIG. 8 is a diagram of example integration between a persistent conversation system and an email system in accordance with some implementations.
Figure 9:
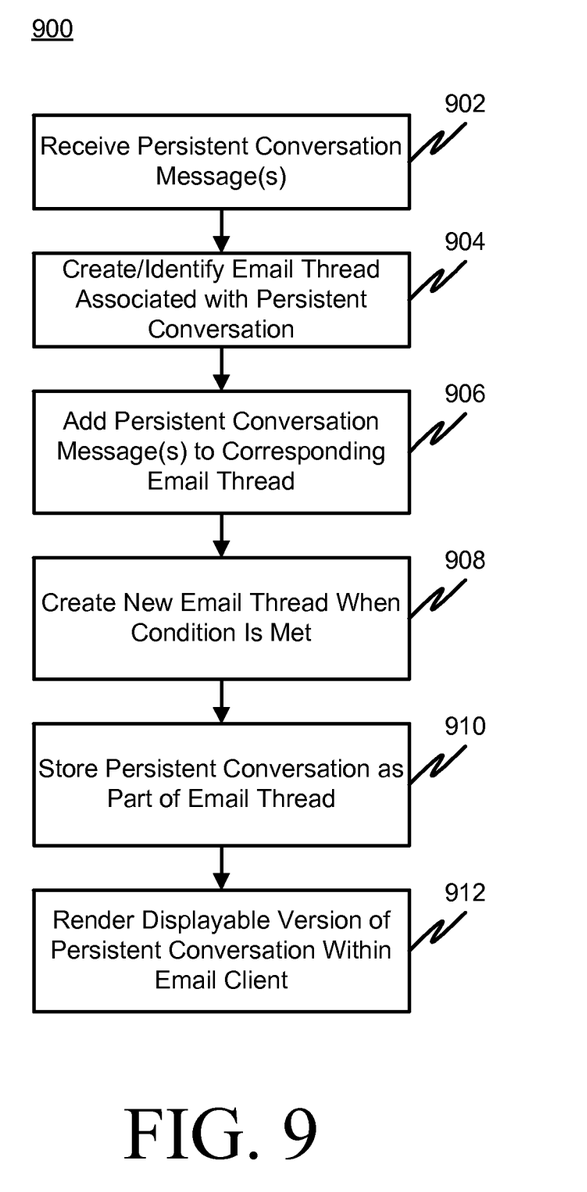
FIG. 9 is a flow chart showing an example method for integration between a persistent conversation system and an email system in accordance with some implementations.
Figure 10:
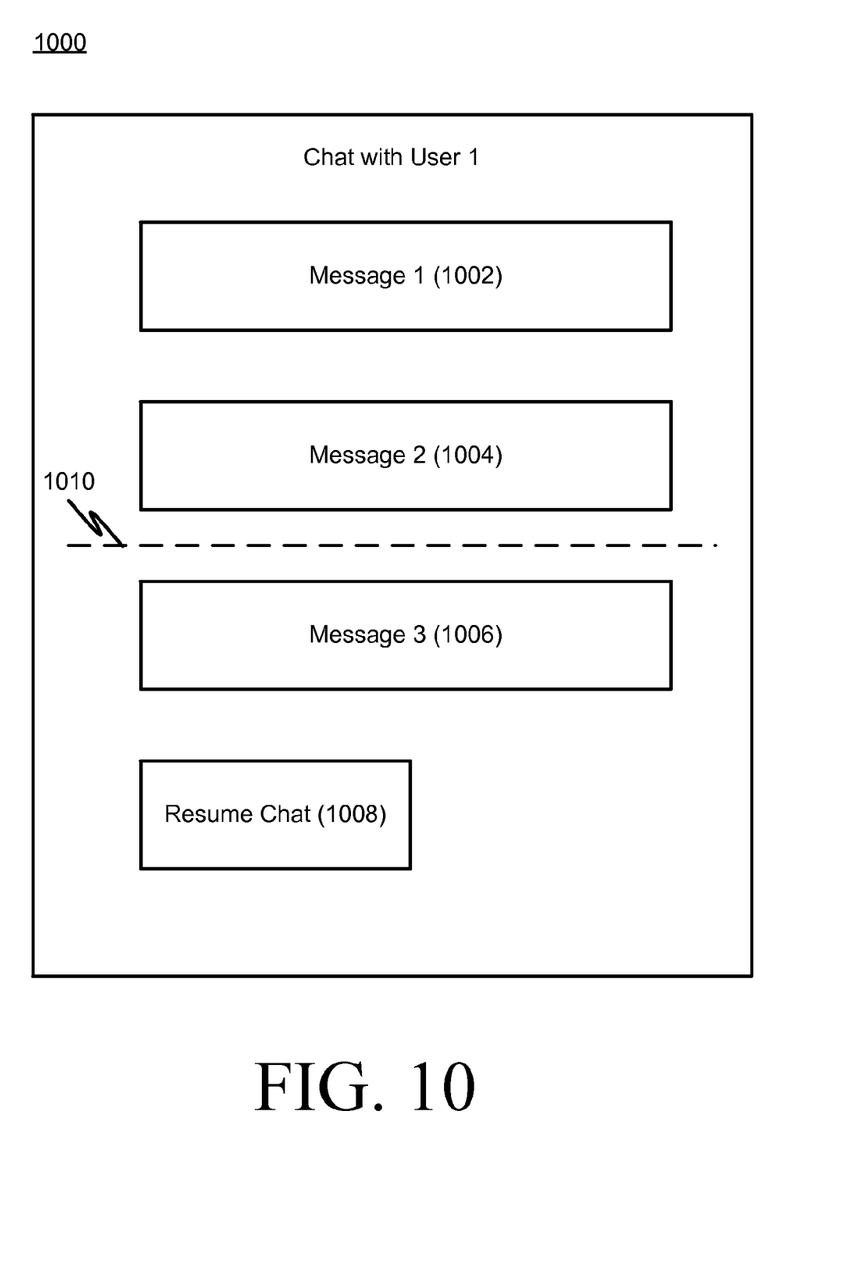
FIG. 10 is a diagram of an example user interface screen for integration between a persistent conversation system and an email system in accordance with some implementations.

FIGS. 1-7 and the corresponding description below relate to persistent conversations generally. FIGS. 8-10 and their corresponding descriptions are directed to integrating persistent conversations with email.

Figure 1:
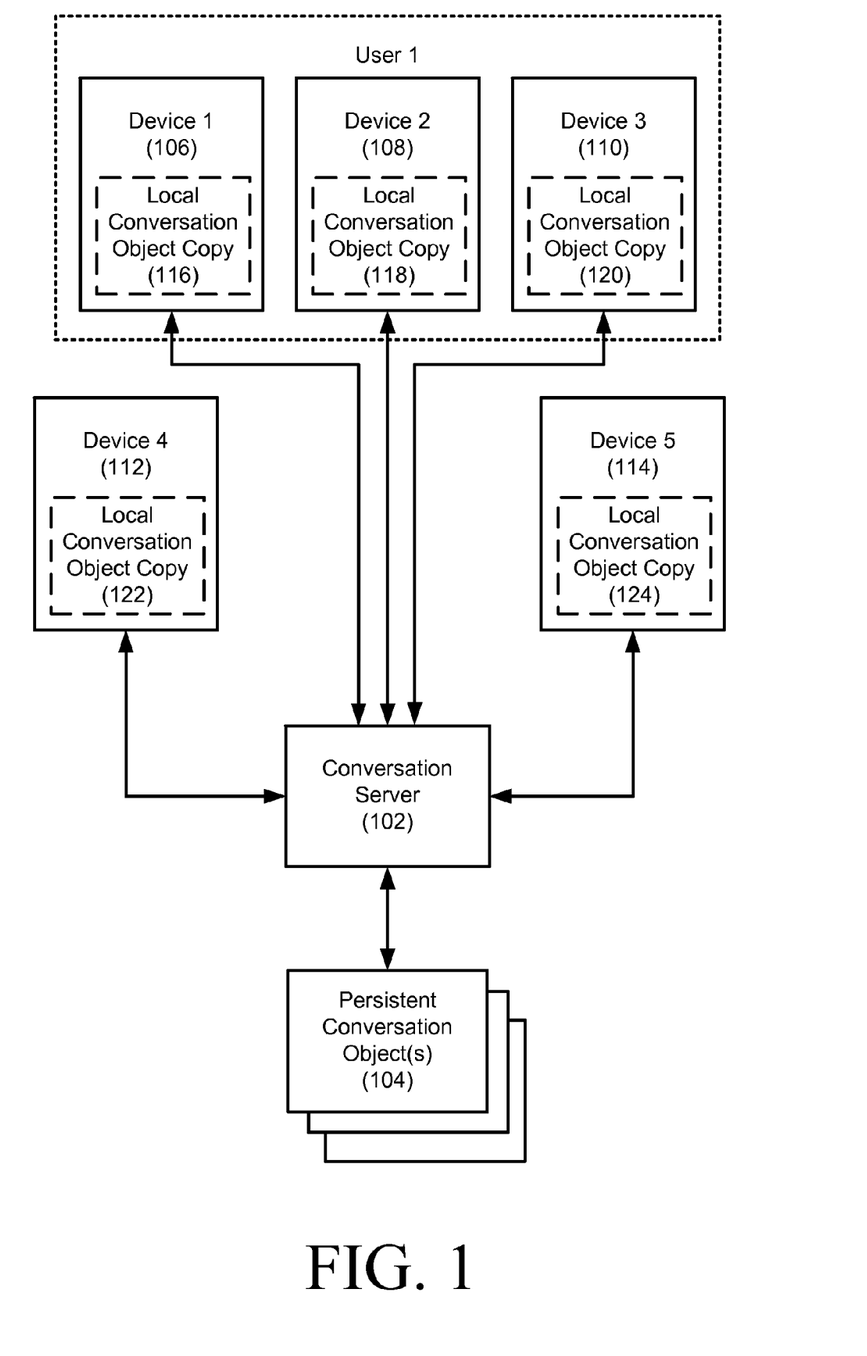
FIG. 1 is a diagram of an example persistent conversation system and user devices in accordance with some implementations.

As shown in FIG. 1, a persistent conversation environment can include a conversation server 102 and one or more persistent conversation objects 104. A plurality of devices (106-114) can be in communication with the conversation server 102. Each device (106-114) can have a local copy (116-124, respectively) of at least a portion of a persistent conversation object (104). Multiple devices can be associated with a single user. For example, Devices 1, 2 and 3 (106-110) are associated with User 1.

In operation, the conversation server 102 receives communication messages from one or more of the devices (106-114) and adds the communication message to a corresponding persistent conversation object (and can first create the persistent conversation object, if one does not exist yet for the conversation). The conversation server updates conversation state information for the persistent conversation object and then sends the communication message and updates, notifications of the newly received communication message and/or the updated conversation state information to the other devices associated with users participating in the corresponding conversation.

Each device can be executing a persistent conversation client that is kept in synchronization with the persistent conversation object(s) 104 stored and maintained by the conversation server 102. The central copy of the persistent conversation object can be a canonical copy of the conversation and/or contain the canonical state of the conversation. A local copy of at least a portion of a persistent conversation object can be cached at each device executing a conversation client associated with a participant in the conversation.

A conversation is initiated when a user starts a conversation with one or more other users. A persistent conversation can be given a name and participants can view members in the conversation and add members to the conversation. A conversation can be fully democratic (e.g., have no owner or moderator). Alternatively, a conversation could be moderated.

Conversations can be one-to-one or group conversations (e.g., at least three participants in a one-to-many or many-to-many arrangement). In any group conversation (e.g., three or more participants), a user can leave the conversation. Any user in any group conversation can add other users to the conversation. In some implementations, a conversation that originates as a one-on-one conversation cannot be converted to a group conversation. In a group conversation, users participating in the conversation can invite other users into the conversation by adding them to the conversation participants (e.g., by adding the new user(s) to the distribution list of users receiving a message in the conversation).

A user participating in a one-on-one conversation may not leave the conversation, but may delete the conversation (or one or more messages within the conversation). A user can delete individual messages from a conversation or the entire conversation. When a conversation (or message) is deleted, it may be removed from the user's device(s), but can remain stored in the persistent conversation object storage (e.g., 104).

A persistent conversation object can include conversation content and state information. The conversation state information can include a current focus state and notification state for each of the conversation participants. For example, the focus state can be one of focused, unfocused and typing. A focused state can be determined on a mobile device, for example, as the conversation client application being open and having visibility on the device display. On a desktop or laptop computer the focused state can be determined from the keyboard and/or mouse focus. In general, any indication that a conversation client application is visible or in use can be used to determine the focused state. The unfocused state can be determined as the opposite of the focused state (e.g., the conversation client application is not open (for mobile devices) or does not have keyboard or mouse focus (for desktop and laptop computers). The typing state can be determined based on the focused state coupled with an indication that the user is entering text (or otherwise entering data for the conversation such as audio, video or the like). Focus states are discussed below regarding FIGS. 3 and 7.

In addition to focus state, the conversation state information can include a watermark or level in the conversation at which each user was last focused on the conversation. This can be used to indicate or suggest a point at which each participant stopped reading the conversation. The watermark can also be used to indicate a read or unread state of the conversation. For example, if the watermark is at the lowest point in the conversation (e.g., at the most recent content addition) then the conversation can be considered to be read by the user. However, if the watermark for a user is not at the lowest point in the conversation then the conversation could be considered to be at least partially unread by that user. Watermarks for a one-on-one conversation are described below regarding FIG. 4 and FIG. 7.

The conversation state information can also include an indication of whether history tracking is enable or disabled. When history tracking is enabled, the conversation content is permanently stored in the persistent conversation object. When the history tracking is disabled (e.g., one or more users wants the conversation "off the record") the conversation will only be stored in the persistent conversation object for a finite time and then deleted. The user interface can be modified to show history tracking disabled (as discussed below regarding FIG. 6). The history enabled/disabled can be a global setting that affects all participants in the conversation.

The conversation state information can also include the name of the conversation and a list of the participants. Focus state, notification state, watermark and history tracking state information indications are applicable to both one-on-one and group conversations.

Some implementations of the method can include receiving a communication message sent from a first user to at least one other user. The communication message can be one or more of a text message, an image file, an audio file, a video file, a phone call, a fax and a one-to-one and/or multi-way video conference. The method can also include generating a persistent conversation object having a conversation content section and conversation state information. The method can include storing the communication message in the conversation content section of the persistent conversation object and forwarding the communication message to the at least one other user. The method can further include updating the conversation state information to reflect the receiving, storing and forwarding of the communication message.

A persistent conversation device client can monitor the focus state of a user. The focus state can include an indication focused, unfocused and typing. Persistent conversation state information can also include a level corresponding to each user indicating a point in the conversation where each user last had focus on the conversation.

Persistent conversations can have history tracking enabled or disabled. The conversation state information can include an indication of whether history tracking is enabled.

The method can include providing, for display, a user interface including at least a portion of the conversation content, an avatar representing each user participating in the conversation and a visual indication of conversation state information.

In some implementations, the method can include updating the avatar appearance based on the focus state of the user corresponding to the avatar. The method can also include rendering, in a display of the conversation content, each avatar at a watermark point of the user associated with the avatar.

While some implementations are discussed herein in relation to certain example message types such as text messaging (e.g., short message service), email, chat, social network messages, one-to-one and/or multi-way audio/video conferences and phone calls, it will be appreciated that persistent conversations can be applied to other know or later developed message or communication types.

Figure 2:
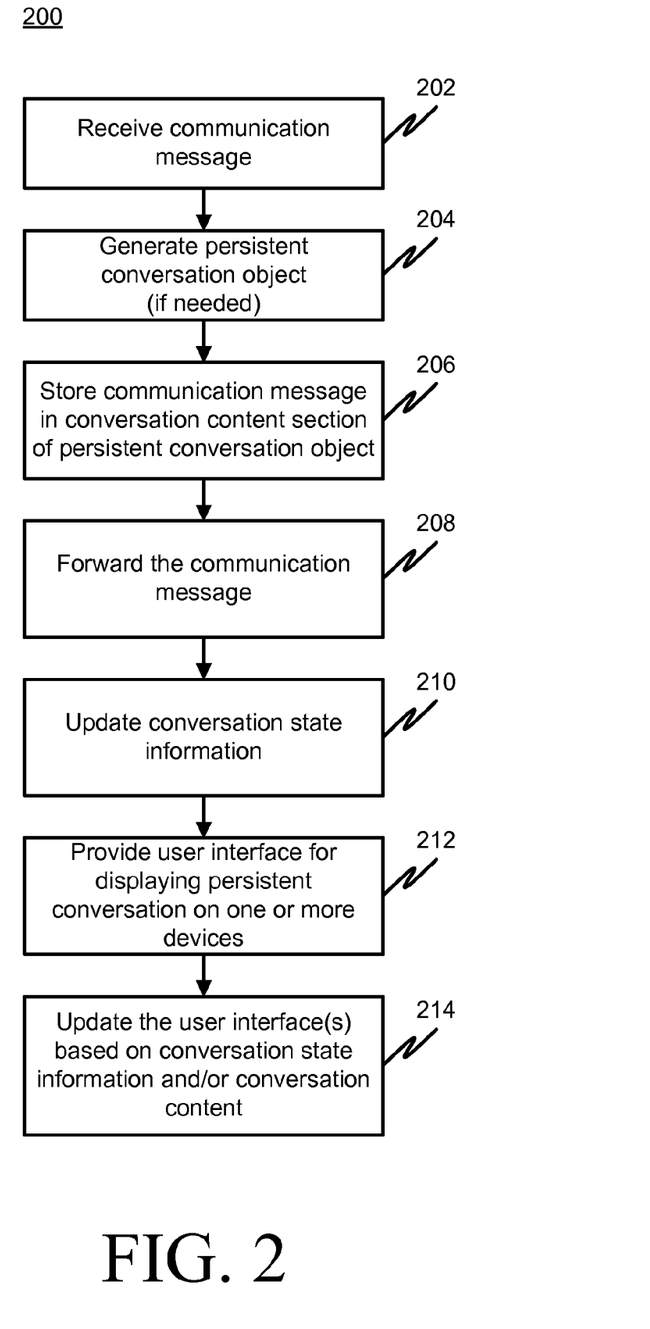
FIG. 2 is a flow chart of an example method for providing persistent conversations in accordance with some implementations.

FIG. 2 is a flow chart of an example method 200 for providing persistent conversations in accordance with some implementations. Processing begins at 202, where a communication message from one user to one or more other users is received. For example, the communication message can be received at a conversation server 102. The communication message can include one or more protocols or types, such as those mentioned above. Processing continues to 204.

At 204, a persistent conversation object is generated (or created) if one does not already exist for the conversation. Generating a persistent conversation object can include adding the communication message (or information representing or linking to the message) to the conversation content section of the conversation object. Generating can also include initializing the conversation state information to reflect the new conversation and the arrival of the communication message. The initial conversation participants can be extracted from the list of intended recipients of the communication message. The conversation can be given a default name. If a persistent conversation object already exists for the conversation, then the existing conversation object can be used. Processing continues to 206.

At 206, the communication message is stored in the conversation content section of the persistent conversation object. Processing continues to 208.

At 208, the communication message is forwarded to the other conversation participants. For example, the conversation server 102 could forward a message from Device 1 106 to the other devices (108-114). The forwarding could be accomplished by synchronizing the local copy of the conversation on each device with the canonical conversation object (e.g., 104). A conversation client on each device could be used to synchronize and update the local conversation object copy (e.g., 116-124). Processing continues to 210.

At 210 the conversation state information is updated to reflect the new communication message and the focus and notification states of the users. Processing continues to 212.

At 212, a user interface for displaying the persistent conversation on each device associated with a participant in the conversation is provided. For example, the user interface could be part of (or coupled to) the conversation client on each device (106-114). Processing continues to 214.

At 214, the user interfaces are updated base on the conversation state information and the conversation content. For example, the user interface could be updated based on synchronizing the content and state information for the conversation so that the user interface on each device shows the new communication message and also reflects real time (or near real time) conversation state information. It will be appreciated that 202-214 can be repeated in whole or in part in order to accomplish a contemplated persistent conversation task.

Figure 3:
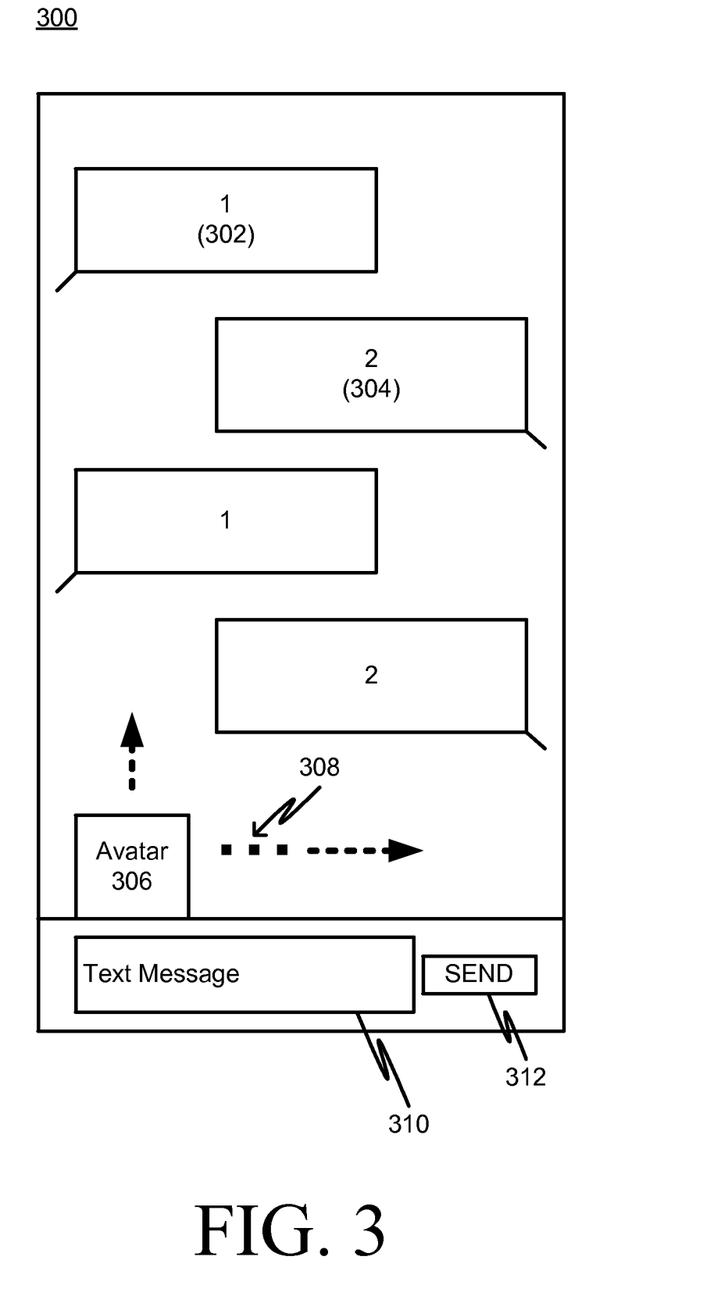
FIG. 3 is a diagram of an example persistent conversation graphical user interface in accordance with some implementations.

FIG. 3 is a diagram of an example persistent conversation graphical user interface 300 in accordance with some implementations. The user interface 300 includes communication messages from a first user (302) and a second user (304). A conversation participant can be represented by an avatar 306. When a user is in a focused or typing state, the avatar 306 can animate and rise in an upward direction as shown by the dashed arrow pointing toward the top of the figure. Also, when the user associated with the avatar 306 is typing, an indication can be made (308) that the user is typing. The indication can include animated dots as shown by the dashed arrow pointing to the right of 306 in FIG. 3.

The user interface 300 can also include a text entry element 310 and a send button 312 for sending the message typed in the text entry element 310.

Figure 4:
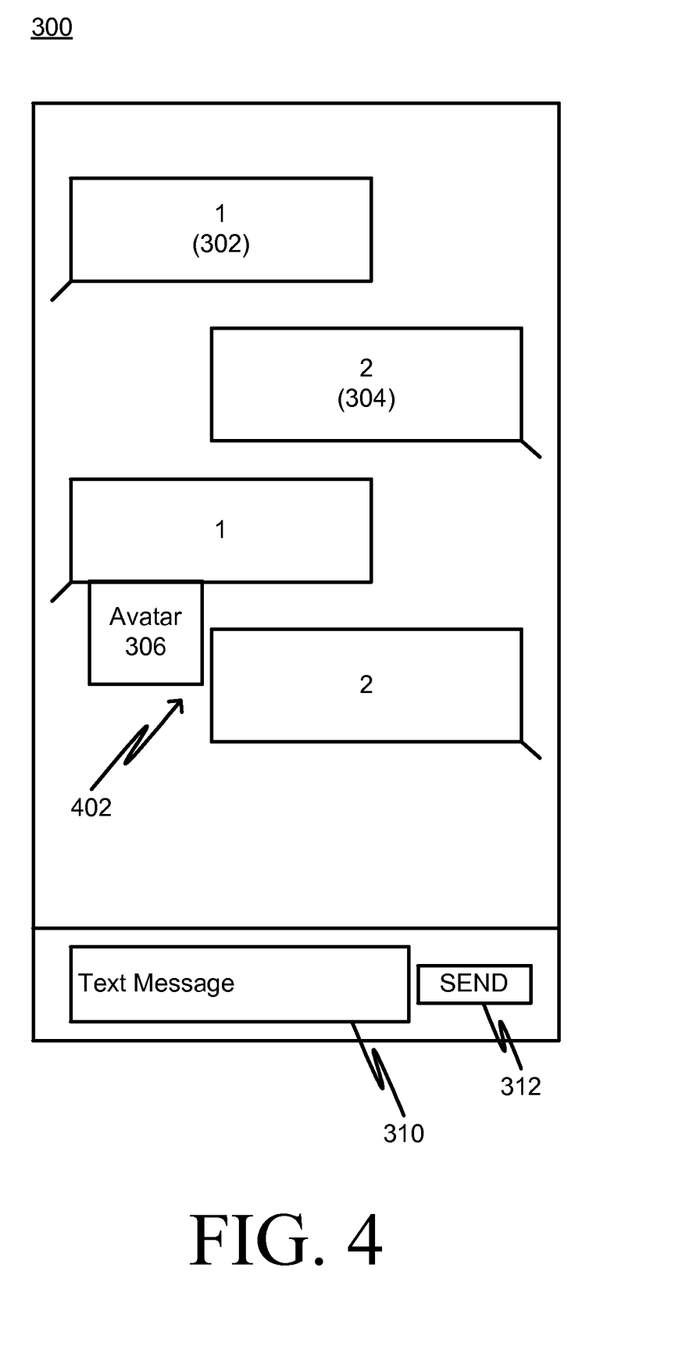
FIG. 4 is a diagram of an example persistent conversation graphical user interface in accordance with some implementations.

FIG. 4 is a diagram of an example persistent conversation graphical user interface in accordance with some implementations. In addition to the elements identified above in connection with FIG. 3, there is shown in FIG. 4 an example of a watermark in which the avatar 306 is placed at a location 402 indicating the watermark for the user associated with the avatar 306.

Figure 5:
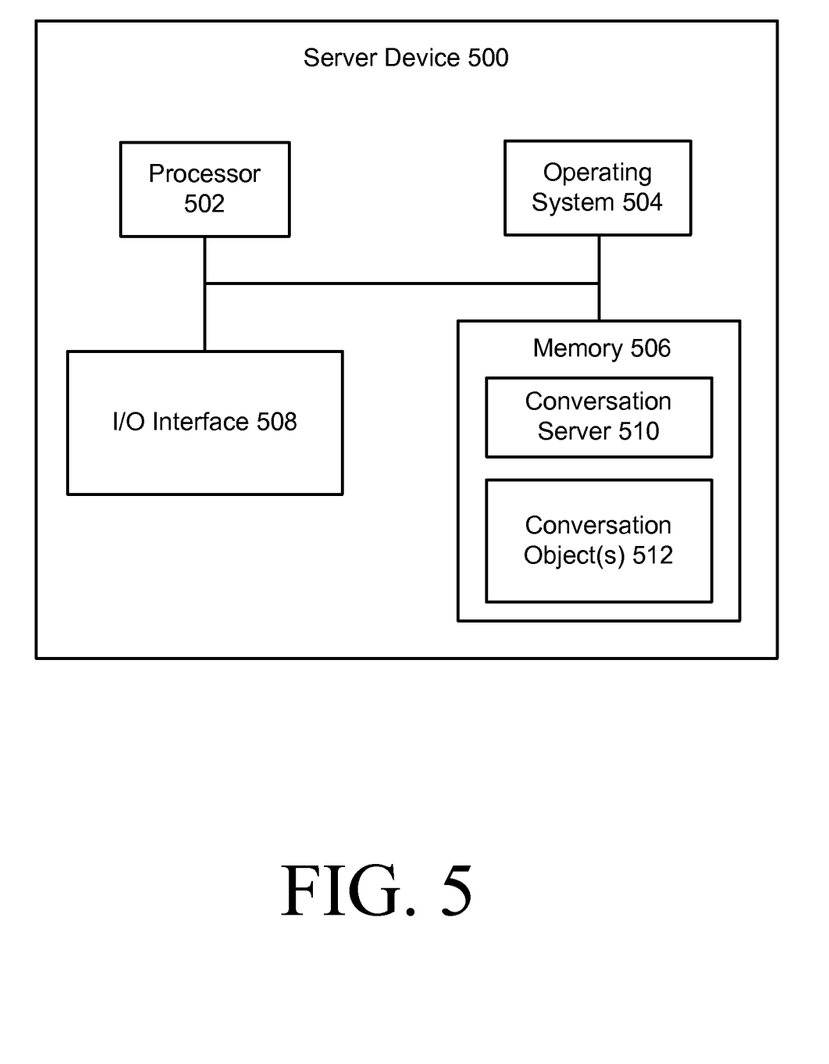
FIG. 5 is a diagram of an example server system in accordance with some implementations.

FIG. 5 is a diagram of an example server device 500 that can be used to create, manage, distribute and cause to be displayed persistent conversations in accordance with some implementations. The server device 500 includes a processor 502, operating system 504, memory 506 and I/O interface 508. The memory 506 can include a persistent conversation server 510 and one or more persistent conversation objects 512.

In operation, the processor 502 may execute the conversation server application 510 stored in the memory 506. The conversation server 510 can include software instructions that, when executed by the processor, cause the processor to perform operations for creating, managing, distributing and causing to be displayed persistent conversations in accordance with the present disclosure (e.g., the conversation server 510 can perform one or more of steps 202-214 described above and, in conjunction, can access the conversation object(s) 512). The conversation server 510 can also operate in conjunction with the operating system 504.

Persistent conversation can be used among members (or users) of a social network. For example, the messages sent between a first social network member and one or more other members in the social graph of the first social network member (or to users outside of the social network) can be exchanged via a persistent conversation as described above.

Figure 6:
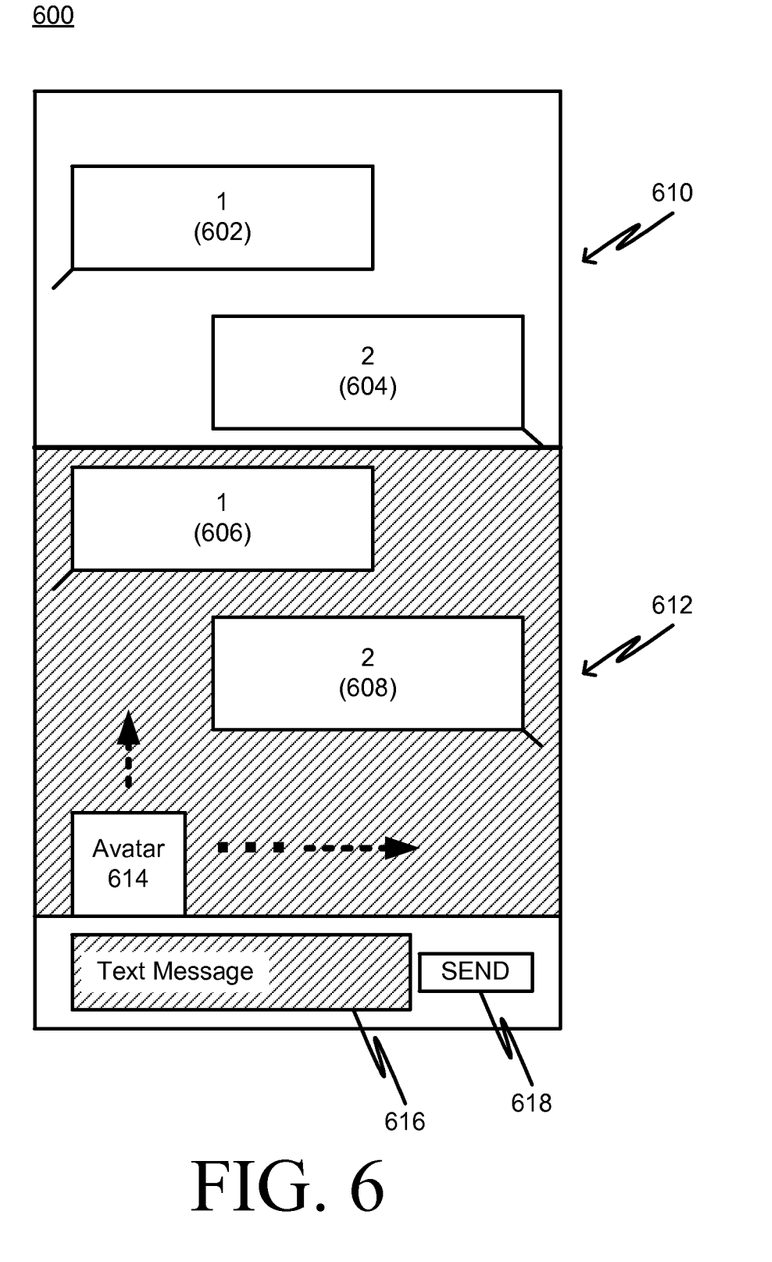
FIG. 6 is a diagram of an example persistent conversation graphical user interface in accordance with some implementations.

FIG. 6 is a diagram of an example persistent conversation graphical user interface 600 in accordance with some implementations. In particular, the user interface 600 includes messages from a first user (602) and a second user (604) in a section of the conversation in which history tracking was enabled 610. There are also messages from the first user (606) and the second user (608) in a section of the conversation in which the history has been disabled 612.

The user interface 600 includes an avatar as described above and a text message area 616 and a send button 618.

When history is disabled (e.g., the conversation is "off the record") the conversation rendering is changed for the section of the conversation which does not have history enabled (e.g., 612). Also, the compose experience can be changed (e.g., the background change in the text box 616) to indicate history is disabled.

Figure 7:
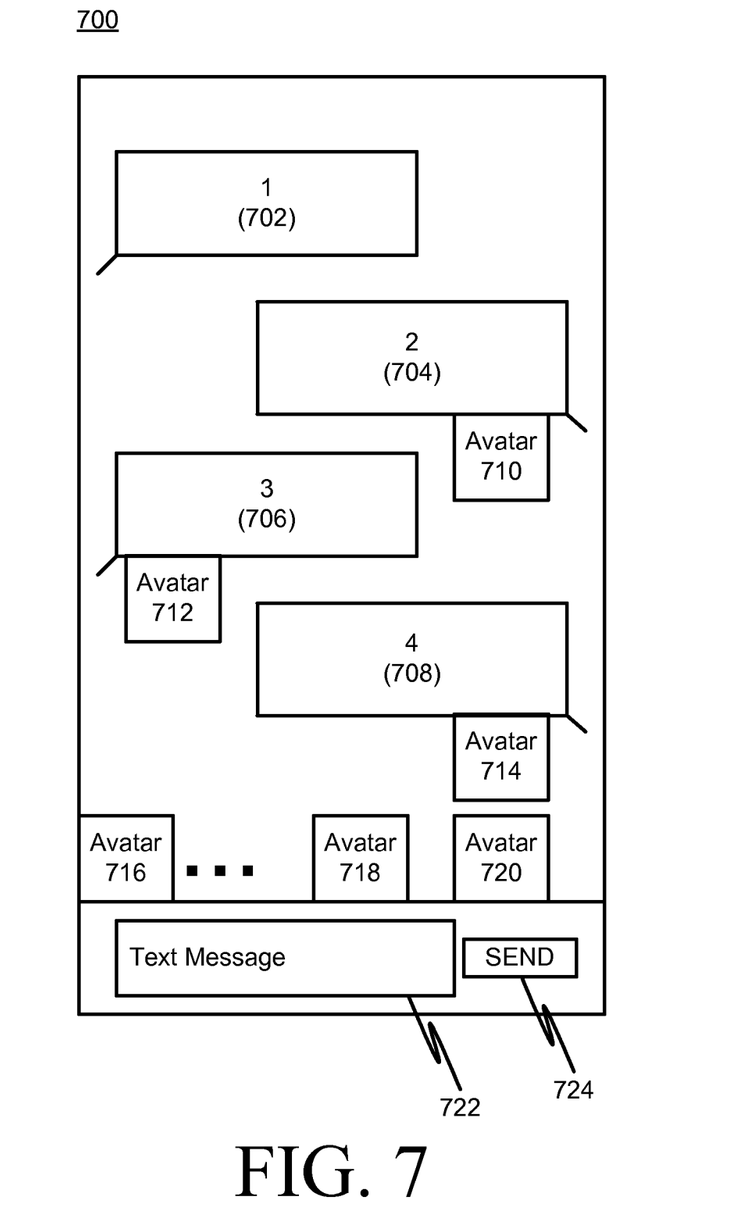
FIG. 7 is a diagram of an example persistent conversation graphical user interface in accordance with some implementations.

FIG. 7 is a diagram of an example persistent conversation graphical user interface 700 in accordance with some implementations. In particular, the user interface 700 shows a group conversation with multiple watermarks and avatars. Messages (702-708) can come from four different respective users. Each avatar (710-720) can be used to represent the watermark and/or state for each user corresponding to that avatar.

For example, the user associated with avatar 710 has a watermark at message 2 (704). The user associated with avatar 712 has a watermark at message 3 (706). The user associated with avatar 714 has a watermark at message 4 (708).

Users associated with avatars 716-720 are giving the conversation (or conversation client application) focus. The user corresponding to avatar 716 is typing.

The user interface 700 also includes a text entry element 722 and a send button 724.

FIG. 8 is a diagram of example integration between a persistent conversation system and an email system. A conversation server 102 is configured to receive persistent conversation messages 802 and store the messages in one or more corresponding persistent conversation objects 104.

In operation, the conversation server 102 is configured to send the persistent conversation messages 802 to an email system 804. The email system 804 is configured to recognize the persistent conversation messages and to store the messages into one or more corresponding email threads 806. For purposes of handling persistent conversation messages, each email thread corresponding to a persistent conversation has an identification number (or other identifier) associating the email thread with the corresponding persistent conversation.

The conversation server 102 can update the email system 804 with persistent conversation messages as new messages are received, on a timed basis or the like. Alternatively, the email system 804 can monitor the persistent conversation via a persistent conversation interface and update the email threads as new message as received. The email system can take individual persistent conversation messages and add them to an email thread as though each message was a separate email message.

The email system can be configured to permit a user to delete a persistent conversation email thread. The system can remove the user from the conversation and/or display a warning the two systems (e.g., persistent conversation server and email system) may become out of synchronization.

In addition to synchronizing persistent conversation messages into email, email messages could be synchronized into the persistent conversation system. Also, in addition to permitting a user to delete an entire thread, the email system could be configured to permit a user to delete individual messages from the persistent conversation email thread, which could then be reflected in the persistent conversation object.

FIG. 9 is a flow chart showing an example method 900 for integration between a persistent conversation system and an email system. Processing begins at 902, where one or more persistent conversation messages are received. The messages could be pushed to an email system by a persistent conversation server, or the messages could be retrieved from the persistent conversation server by the email system. Processing continues to 904.

At 904, the system can identify or create and email thread associated with a persistent conversation corresponding to a received message. If an email thread exists that corresponds to the persistent conversation, then the system can identify that thread. Otherwise, the system can create a new email thread for the persistent conversation. Processing continues to 906.

At 906, the persistent conversation message is added to the email thread created or identified in 904. The persistent conversation message can be added to the email thread as if the message were an email message. Processing continues to 908.

At 908, a new email thread is created when a condition is met. The condition can include an elapsed time (e.g., three hours) between messages in the persistent conversation. The condition can also include a maximum number of persistent conversation messages (e.g., 1000) added to a thread. The email message thread can include metadata that has an identifier that refers to the persistent conversation. In addition to the identifier, individual thread can also be labeled separately. Processing continues to 910.

At 910, the persistent conversation messages are stored as part of the email thread. Processing continues to 912.

At 912, the system can render (or generate) a displayable version of the persistent conversation within the email client. When displayed, the persistent conversation can appear as a continuous conversation even though it may be composed of multiple email threads. The user interface can permit a user to scroll back in time in the conversation and the system will dynamically load more historical messages, if any, to display. It will be appreciated that 902-912 can be repeated in whole or in part in order for a contemplated persistent conversation and email integration task.

FIG. 10 is a diagram of an example user interface screen 100 for integration between a persistent conversation system and an email system. The user interface include a plurality of persistent conversations (1002-1006) shown in an email client display. The user interface also includes an element 1008 for resuming the persistent conversation from within the email client. A dividing line 1010 can be used to indicate when a new thread has been started. For example, Messages 1 and 2 (1002-1004) may be from one email thread, while message 3 (1006) is from a different email thread.

The email user interface 1000 can also include an element 1008 for resuming communications (e.g., a chat session) with one or more users associated with the persistent conversation.

The server (e.g., 500) can include, but is not limited to, a single processor system, a multi-processor system (co-located or distributed), a cloud computing system, or a combination of the above.

The client (or user, member or conversation participant) device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The network connecting user devices to a conversation server can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or computer readable media having stored instructions for performing one or more persistent conversation tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for integrating persistent conversations with email.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   receiving a persistent conversation communication message sent from a first user to at least one other user;
   adding the persistent conversation communication message to an email thread associated with a persistent conversation, wherein the persistent conversation is stored in a central persistent conversation object;
   storing the persistent conversation communication message as part of the email thread;
   creating a new email thread associated with the persistent conversation when a predetermined condition is met, wherein the condition is one of an elapsed time or reaching a predetermined number of messages in the email thread and wherein the new email thread is assigned an identifier associating the new email thread with the central persistent conversation object; and
   rendering a displayable version of the persistent conversation within an email client, the displayable version including a continuous display of email threads associated with the persistent conversation, wherein the new email thread is indicated separately in the displayable version.

2. A method comprising:
   receiving a persistent conversation communication message sent from a first user to at least one other user;
   adding the persistent conversation communication message to an email thread associated with a persistent conversation, wherein the persistent conversation is stored in a central persistent conversation object;
   storing the persistent conversation communication message as part of the email thread;
   creating a new email thread associated with the persistent conversation when a condition is met, wherein the new email thread is assigned an identifier associating the new email thread with the central persistent conversation object; and
   rendering a displayable version of the persistent conversation within an email client, the displayable version including a continuous display of email threads associated with the persistent conversation, wherein the new email thread is indicated separately in the displayable version.

3. The method of claim 2, wherein the persistent conversation communication message includes a chat message.

4. The method of claim 2, wherein the condition includes an elapsed time between messages in the persistent conversation exceeding a threshold.

5. The method of claim 2, wherein the condition includes reaching a predetermined number of messages in the email thread.

6. The method of claim 2, further comprising updating the email thread to reflect new activity in the persistent conversation.

7. The method of claim 2, further comprising:
   providing for display a user interface including the displayable version of the persistent conversation.

8. The method of claim 2, further comprising dynamically rendering the displayable version to show updates to the persistent conversation as the updates are received by an email client application.

9. A system comprising:
   one or more computers configured to perform operations including:
      receiving a persistent conversation communication message sent from a first user to at least one other user;
      adding the persistent conversation communication message to an email thread associated with a persistent conversation, wherein the persistent conversation is stored in a central persistent conversation object;
      storing the persistent conversation communication message as part of the email thread;
      creating a new email thread associated with the persistent conversation when a condition is met, wherein the new email thread is assigned an identifier associating the new email thread with the central persistent conversation object; and
      rendering a displayable version of the persistent conversation within an email client, the displayable version including a continuous display of email threads associated with the persistent conversation, wherein the new email thread is indicated separately in the displayable version.

10. The system of claim 9, wherein the persistent conversation communication message includes a chat message.

11. The system of claim 9, wherein the condition includes an elapsed time between messages in the persistent conversation exceeding a threshold.

12. The system of claim 9, wherein the condition includes reaching a predetermined number of messages in the email thread.

13. The system of claim 9 wherein the operations further comprise updating the email thread to reflect new activity in the persistent conversation.

14. The system of claim 9, wherein the operations further comprise providing for display a user interface including the displayable version of the persistent conversation.

15. The system of claim 9, wherein the operations further comprise dynamically rendering the displayable version to show updates to the persistent conversation as the updates are received by an email client application.

* * * * *